March 15, 1960     R. H. BERTSCHE ET AL     2,928,963
DYNAMOELECTRIC MACHINE

Filed June 6, 1956     4 Sheets-Sheet 1

INVENTORS
RALPH H. BERTSCHE
ELDRED E. GEGENHEIMER
BY John T. Marvin
THEIR ATTORNEY

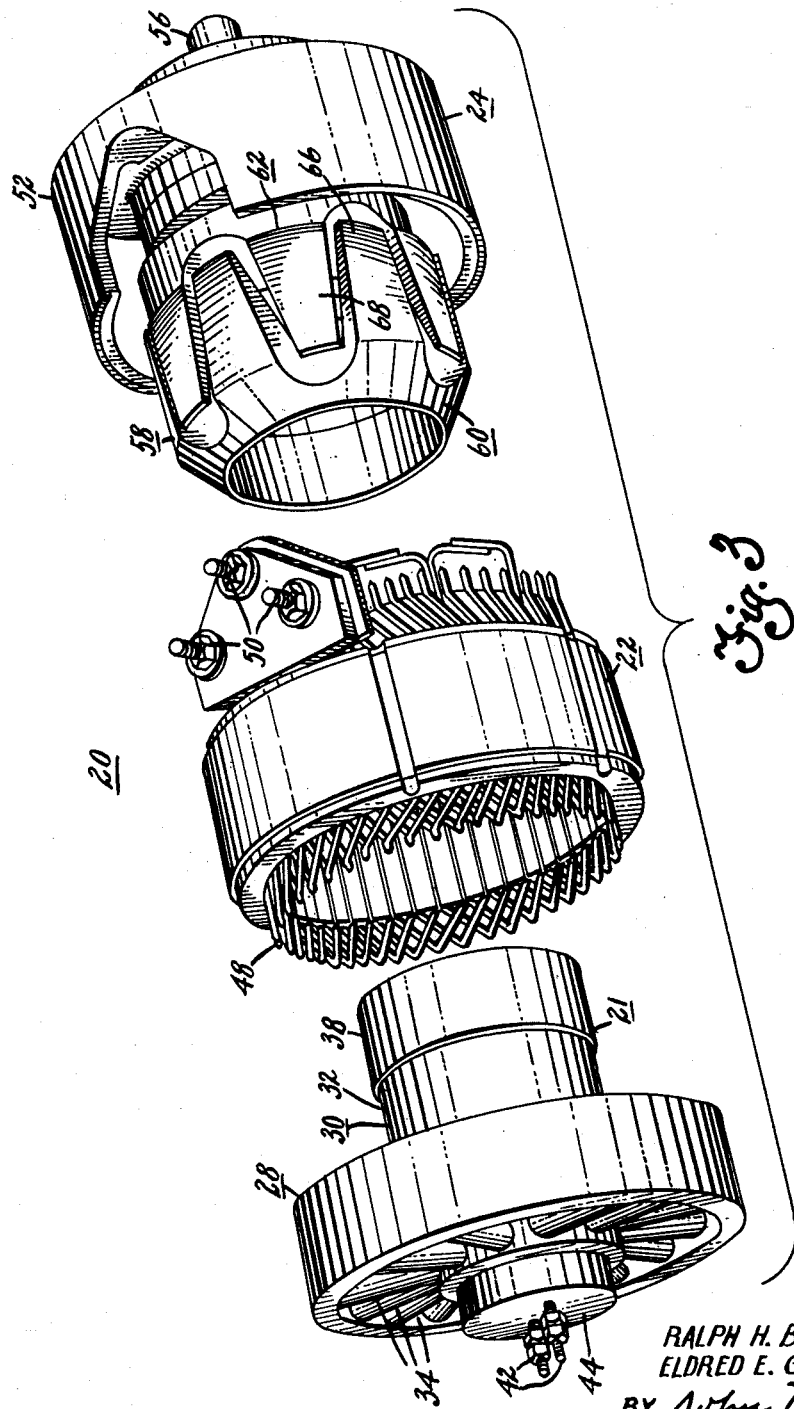

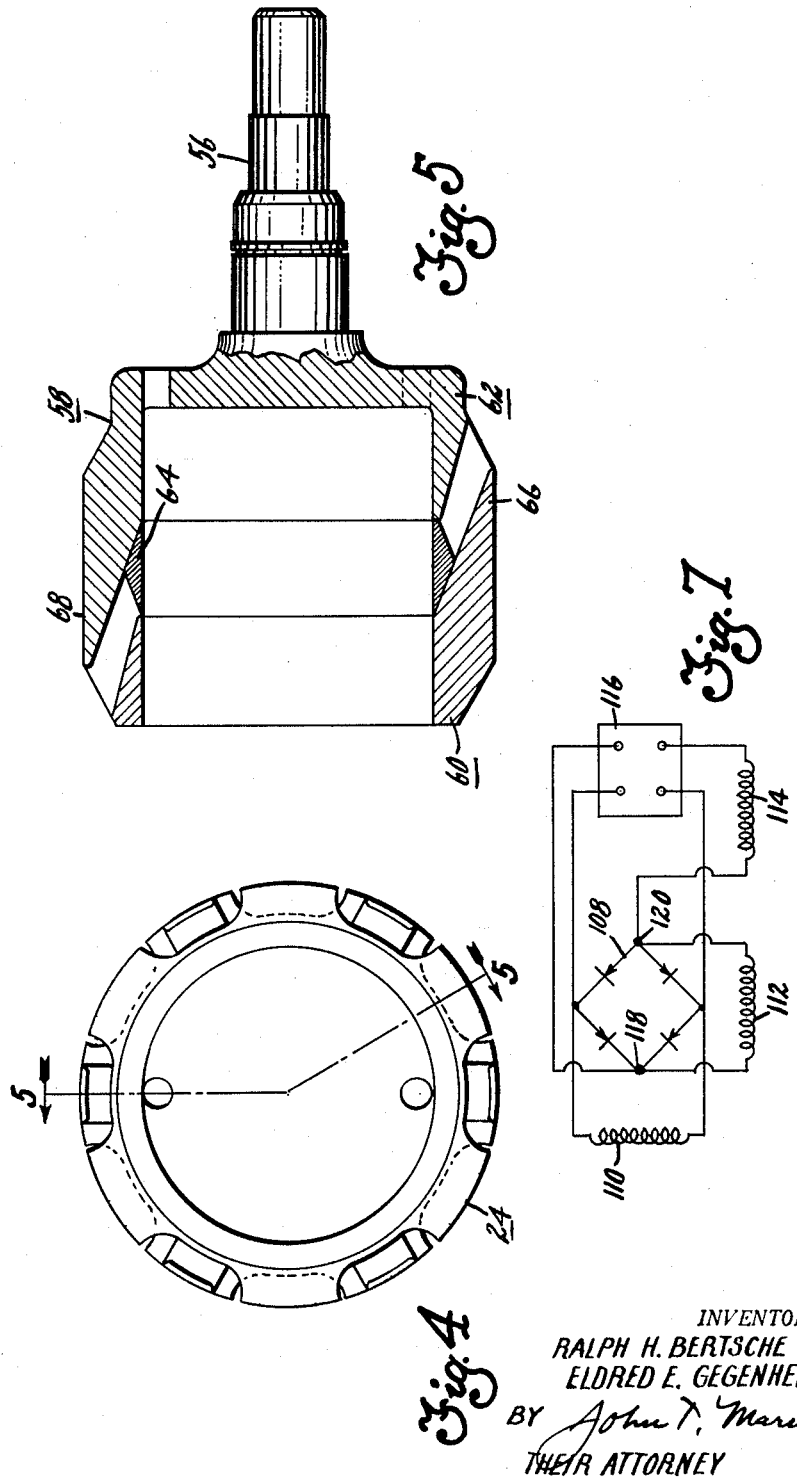

March 15, 1960 R. H. BERTSCHE ET AL 2,928,963
DYNAMOELECTRIC MACHINE
Filed June 6, 1956 4 Sheets-Sheet 4

INVENTORS
RALPH H. BERTSCHE
ELDRED E. GEGENHEIMER
BY John T. Marvin
THEIR ATTORNEY

United States Patent Office 2,928,963
Patented Mar. 15, 1960

2,928,963

DYNAMOELECTRIC MACHINE

Ralph H. Bertsche, Royal Oak, and Eldred E. Gegenheimer, Clawson, Mich., assignors to General Motors Corporation, Detroit, Mich., a corporation of Delaware Application June 6, 1956, Serial No. 589,759

3 Claims. (Cl. 310—168)

This invention relates to alternating current generators and more particularly to brushless induction type alternators.

It is a prime object of the present invention to provide an alternating current generator or alternator without brushes communicating rings or other types of devices which will require the conduction of electric currents between a stationary and moving parts.

It is another object of the present invention to provide a motor vehicle with an alternating current generator which will function without brushes, slip rings or bearings and have a sufficient output, controlled by a regulator, which will furnish the electrical loads of the vehicle and charge a storage battery.

Another object of the present invention is to provide an alternator with stationary stator and field windings and to rotate a magnetic pole assembly between the stator and field windings.

A further object of the present invention is to form the magnetic pole assembly of two sections of magnetic material and to space and secure these parts together with a part of non-magnetic material.

A still further object of the present invention is to provide a brushless alternator with a stationary stator and field windings and to rotate the magnetic poles between the stator and field windings which are compounded so only a portion of the energizing current to the field is regulated to control the output of the alternator output.

In carrying out the above objects it is a further object of the present invention to mount the stator and field windings on the flywheel housing of a motor vehicle and to mount an assembly of magnetic material on the flywheel of the vehicle's prime mover so that the magnetic assembly will rotate between the stator and field windings.

Further objects and advantages of the present invention will be apparent from the following description, reference being had to the accompanying drawings, wherein a preferred embodiment of the present invention is clearly shown.

In the drawings:

Fig. 3 is an exploded view showing in perspective the three assemblies for the alternator in Fig. 2.

Fig. 4 is an end view of the rotor used in the alternator in Fig. 2.

Fig. 5 is as side view partly in section of the rotor taken along line 5—5 in Fig. 4.

Fig. 7 diagrammatically shows a wiring diagram of the connections for the compounding field according to the alternator according to the present invention.

Figure 2:
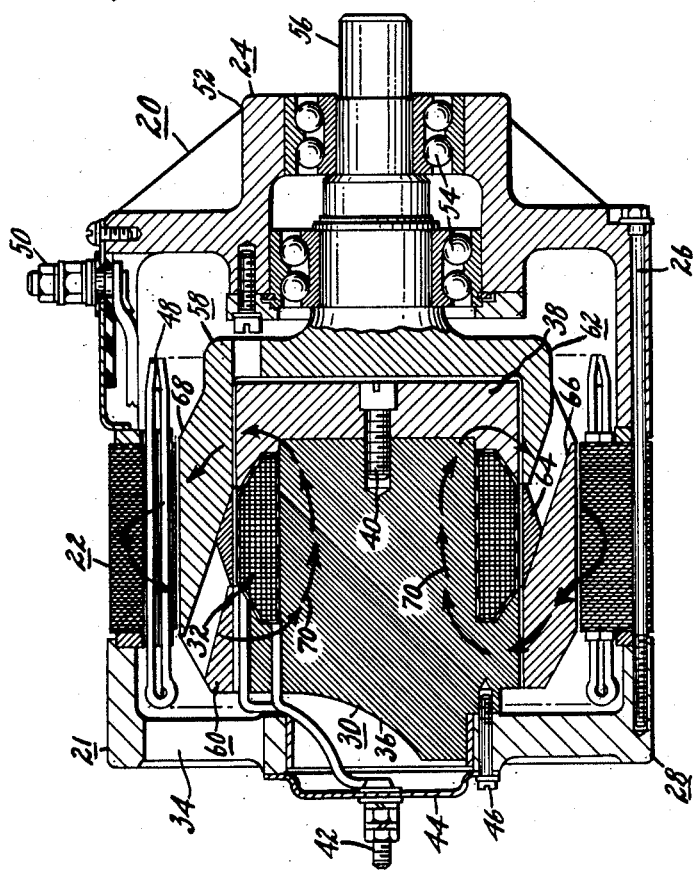
Fig. 2 is a view partly in section along line 2—2 of Fig. 1.
Figure 1:
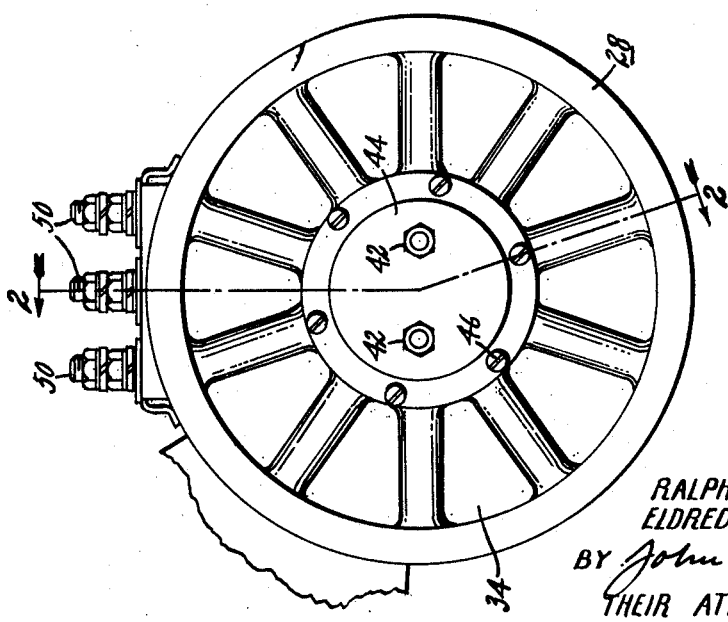
Fig. 1 is an end view of one form of the alternating current generator according to the present invention.

In the drawings and in Fig. 3 particularly, the components for the alternator 20 according to the present invention are shown. These components include a field winding assembly 21, a stator winding assembly 22 and a magnetic pole assembly 24. These assemblies are secured as shown in Fig. 2 by bolts 26.

The exciting field winding assembly 21 for the alternator 20 includes an end frame 28, a magnetic core 30 and field core windings 32. The end frame 28 which forms a portion of the housing for the alternator 20, is formed with radial openings 34 where through cooling air may pass to cool the internal parts of the alternator. The core 30 is preferably formed in two parts, 36 and 38. These parts are formed as shown to hold the coil windings 32 in position when parts 36 and 38 are secured together by a bolt 40. In Fig. 2, parts 36 and 38 are shaped and arranged to provide two oppositely facing U-shaped members. The ends of these U-shaped members are closely spaced to the magnetic poles, which will be hereinafter described. The coil windings 32 preferably are wound to include a field regulating winding and a field compounding winding. These windings are circuited as shown in Fig. 7 and are sized and arranged to provide the alternator with the proper output characteristics. The ends of both of the coil windings extend through suitably located slots in part 36 to the end frame 28 where they are secured to the terminals 42. The terminals 42 are secured in an end cover 44 which is held in position on the end frame 28 by bolts 46, which also secure the magnetic core 30 on the end frame 28.

The stator assembly shown in Fig. 3 forms the central portion of the alternator housing and includes the excited stator windings 48 which are held in position in slots in the magnetic iron of the stator as well known to those skilled in the art. The stator 22 as here shown is wound to have three-phase windings which are connected to terminals 50. In this connection it is to be noted that like the field coil windings 32, the stator windings 48 are stationary and are radially spaced from the field core 30 when the alternator unit is assembled. Further the stator windings may be other than three phase, if desired, and may be either delta or Y connected.

The magnetic pole assembly 24 includes an end casting 52 which forms another portion of the housing for the alternator. The casting 52 may be notched as shown in Fig. 3 to receive the terminal portion 50 of the stator and may have suitable openings therein, not shown, to provide a passage for the air which passes through openings 34. The end casting 52 supports the bearings 54 for the shaft 56 for the magnetic rotor assembly shown on Figures 4 and 5. The rotor assembly 58 is formed of parts 60 and 62 which are formed of magnetic material. The parts 60 and 62 are held in spaced relation to one another by an annular spacer 64 which is formed of a non-magnetic material. While any other means, such as a use of a non-magnetic spacer and non-magnetic bolts may be used to hold the parts 60 and 62 together and in spaced relation, in the preferred embodiment the materials of parts 60 and 62 are suitably welded or brazed to the annular non-magnetic part 64 which may be of aluminum if desired. The shaft 56 is preferably integrally formed with the part 62 and when positioned in the bearings 54 will maintain the rotor parts 60 and 62 in position between the magnetic field assembly 30 and the stator 22. Each of the parts 60 and 62 have finger-like projections 66 and 68 formed thereon, respectively. The fingers of one part are spaced from the fingers of the other part and extend in opposite directions and are spaced from and rotate in the space between the field core 30 and the stator windings 48 when the rotor assembly is rotated through shaft 56.

When the field coil is energized, a strong magnetic flux is developed in the U-shaped field iron 36. This flux flows in a magnetic circuit indicated by the arrows 70 and magnetizes the parts 60 and 62 so that the fingers 66 and rotor part 60 will be of the opposite plurality from the finger 68 and rotor part 62. These fingers are rotated and the flux passing between the rotating fingers and parts 60 and 62 cuts the conductor windings 48 of the stator to induce an electrical current therein.

Figure 6:
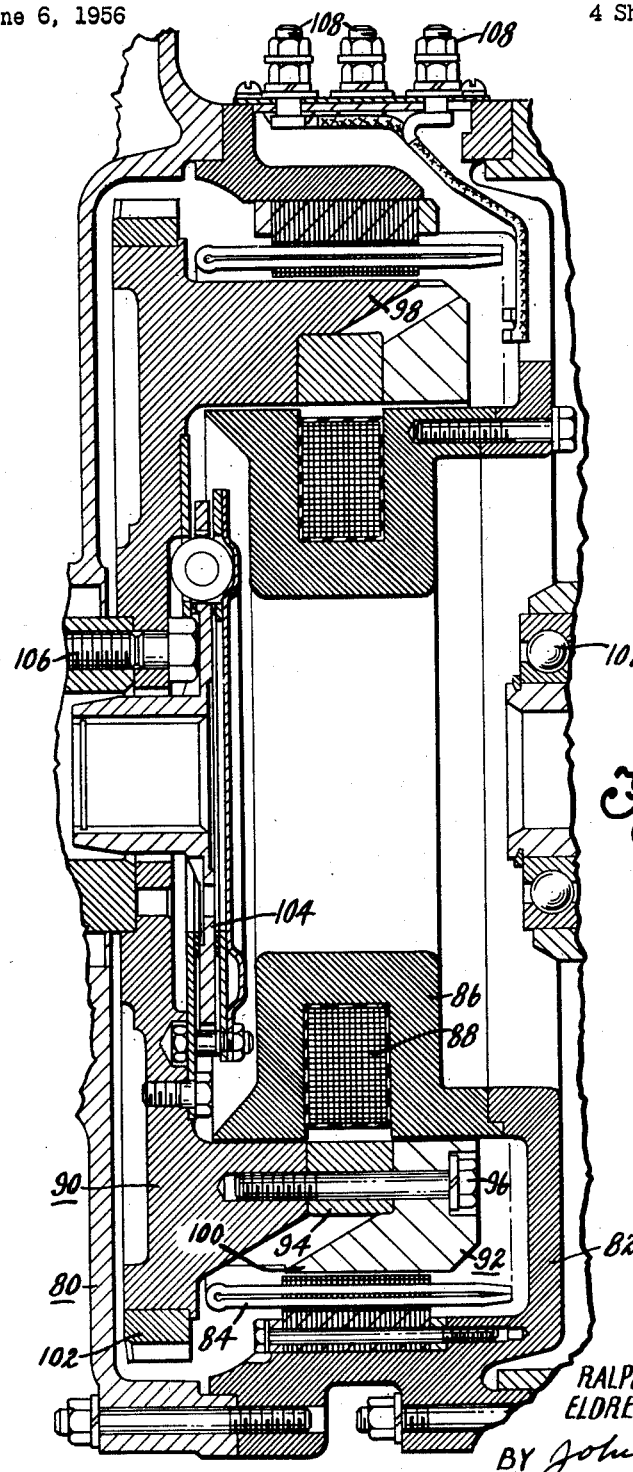
Fig. 6 is a view partly in section of another form of the alternator according to the present invention as installed in a flywheel housing of an automotive vehicle.

In Fig. 6 of the drawings an arrangement is shown whereby the alternator according to the present invention may be mounted within the flywheel housing of an internal combustion engine as used on an automotive vehicle. In this embodiment, the flywheel housing 80 supports the stator 82 which includes stator windings 84 and the U-shaped field iron 86 which supports the compounded field coil windings 88. In this embodiment, the magnetic pole assembly preferably serves as a flywheel for the automotive vehicle and is formed of parts 90 and 92 which are held spaced from each other by a non-magnetic part 94. The parts 90, 92 and 94 are secured to each other by a plurality of radially located bolts 96 which are of non-magnetic material. The parts 90 and 92 form a cup-shaped annulus and each have spaced fingers 98 and 100 which are spaced from each other as described in the preceding embodiment. The part 90 may also support the ring gear 102 which is used in connection with the engine starting apparatus and a flexible coupling 104. The part 90 is secured to the engine drive shaft by means of radially located bolts 106. The end connections for field windings 88 and the stator windings 84 are preferably passed through suitable slots where they are connected with terminals 108 which is carried by the flywheel housing. From the above it is manifest that a very compact unit is accomplished which may be readily enclosed with the flywheel housing. This unit will have the required output to satisfy the demands of the vehicle wherein it is included and may be wound in a means well known to those skilled in the art to be of the single or multiple phase types having either Y or delta connected stator windings. The bearing 107 supported by the transmission case 80 journals a drive shaft, not shown, which transmits power to the wheels of the vehicle. In this connection it is to be noted that the field iron 86, rotor parts 90 and 92 and stator 82 are coaxial and concentric to one another. In Fig. 7 of the drawings it will be seen that a suitable rectifier 108 when connected to the output terminals of the stator winding 110 will provide current to both the compounding field winding 112 and the regulating field winding 114. The compounding field 112 is directly connected across the output terminals of the rectifier. The regulating field winding 114 may be connected to a suitable regulator 116 which is diagrammatically shown and which closes a circuit between the output leads 118 and 120 of the rectifier 108 and the regulating field in response to the output of the alternator windings 110. The regulator 116 here shown may be either current responsive, voltage responsive or both and is connected as well known to inversely vary the current flowing through field winding 114 in response to the output of the alternator. It has been found that if the compound winding is utilized, the alternator output can be satisfactorily controlled by varying the current flow in the regulating winding. This means smaller currents are required to pass through the regulator which will permit the use of less expensive regulators and will assure longer regulator life.

While the embodiment of the present invention as herein disclosed, constitutes a preferred form, it is to be understood that other forms might be adopted.

What is claimed is as follows:

1. An alternating current generator comprising, a first end frame, a second end frame, means securing said end frames from relative movement with respect to each other, a field assembly fixed to said second end frame, said field assembly including, a core member having a central portion and a pair of U-shaped sections facing each other and forming a circumferentially extending opening partially closed by the ends of said U-shaped sections, a field winding positioned in said circumferentially extending opening, a stator winding spaced radially from said field assembly, and a cup-shaped rotatable rotor assembly journalled for rotation in said first end frame, said rotor being formed of two magnetic parts having axially extending circumferentially spaced interleaved fingers secured together by a non-magnetic part.

2. An alternating current generator comprising, a first end frame, a second end frame, means securing said end frames from relative movement with respect to each other, a field assembly fixed to said second end frame, said field assembly including, a core member having a central section and a U-shaped section, a member secured to one end of said core member having a U-shaped section facing said other U-shaped section to form a circumferentially extending opening partially closed by the ends of said U-shaped sections, a field winding positioned in said circumferentially extending opening, a stator winding spaced radially from said field assembly, and a cup-shaped rotatable rotor assembly journalled for rotation in said first end frame, said rotor being formed of two magnetic parts having axially extending circumferentially spaced interleaved fingers secured together by a non-magnetic part.

3. The generator according to claim 2 wherein said second end frame is formed with a plurality of openings connecting the interior and exterior of the generator.

References Cited in the file of this patent

UNITED STATES PATENTS

| | | |
|---|---|---|
| 1,522,612 | Burchett | Jan. 13, 1925 |
| 2,071,953 | Schou | Feb. 23, 1937 |
| 2,409,557 | Gilfillan | Oct. 15, 1946 |

FOREIGN PATENTS

| | | |
|---|---|---|
| 614,091 | Great Britain | Dec. 9, 1948 |
| 644,192 | Great Britain | Oct. 4, 1950 |